Patented May 14, 1946

2,400,295

UNITED STATES PATENT OFFICE 2,400,295

INSECTICIDES

Karl Folkers, Plainfield, Edward Rogers, Cranford, and Ralph E. Heal, New Brunswick, N. J., assignors to Merck & Co., Inc., Rahway, N. J., a corporation of New Jersey No Drawing. Application August 26, 1942, Serial No. 456,203

15 Claims. (Cl. 167—24)

This invention relates to insecticides, and more particularly to insecticides which have both a repelling and killing effect on insects.

We have discovered that extracts or concentrates comprising alkaloids of plants of the genus Ryania exhibit pronounced insecticidal action. Such products have the advantage that they are not only fatally toxic to insects, but are also effective in repelling insect attack.

The Ryania products of our invention comprise mixtures of alkaloids, or "crude alkaloids." The term "alkaloid," as commonly used, covers all complex, organic amines or substituted amines of plant origin not clearly included in one of the following groups: proteins and peptides, plant pigments, and glucosides. The older definitions of the term "alkaloid" emphasize the basicity of alkaloids and, as a function of this basicity, their precipitation by alkaloid reagents.

Such emphasis is believed to be unwarranted, because amines may be acidic, basic, or neutral, depending upon the manner of substitution at the nitrogen atom, and upon the character of other substituent groups. The Ryania products described herein analyze approximately 2% nitrogen. Since protein and glucoside tests are negative, and the products are nearly colorless, they are believed to be properly designated as alkaloid mixtures, or a crude alkaloid fraction.

The new insecticides of our invention may be produced by subjecting parts of plants of the genus Ryania, such as roots, stems, leaves, etc., to treatment with extracting solvents. The extraction process may be carried out at room temperature, or at higher temperatures, for such periods of time as will ensure substantial exhaustion of the alkaloids from the starting materials, as will more fully appear from the examples and illustrations given herein.

Solvents suitable for the preparation of Ryania products according to our invention include water, aliphatic alcohols, acetone, ether, ethyl acetate, chloroform, ethylene dichloride, benzene, dioxane, etc. The extracts thus obtained may be utilized per se, or the extracting solvent may be removed, as by evaporation, to produce a dry concentrate comprising the alkaloid fraction.

Many variations may be made in the method of producing the Ryania insecticides of our invention. If desired, the selected plant part, in some instances, after defatting, may be subjected to successive extractions with one or more solvents. Thus, for instance, the Ryania plant parts may be extracted one or more times with water, and the extract thus obtained preferably concentrated to reduce volume, after which the concentrated material may be extracted successively with one or more other different solvents.

Furthermore, within the purview of our invention, and as a further embodiment thereof, we have discovered that highly active Ryania products are obtained when certain of the extracting solvents are utilized in combination. As an illustration of this feature of our invention, the plant parts may be thoroughly wet with water, and the water-saturated material may then be extracted with a solvent such as chloroform, ether, benzene, etc.

It is also within the scope of our invention to prepare an initial extract of the Ryania plant parts, such as an alcohol extract, for instance, concentrate to reduced volume, and treat the concentrate with a substance such as magnesium oxide powder. The product thus obtained may then be extracted with a solvent such as acetone, for example, and worked up for the production of an extract or concentrate comprising the alkaloid mixture.

Generally speaking, the concentrates of our invention occur in the form of tan or light-brown colored, amorphous powders which are soluble in a wide range of organic and inorganic solvents, giving light-brown solutions. The products are stable in air, soluble in absolute alcohol and are not hydrolyzable in acid to reducing sugar.

In practice, our new products comprising the alkaloid fraction may be employed as such, or they may be concentrated to dryness. The concentrates obtained may be used per se, for example, they may be sprinkled around insect runs, such as cockroach runs, or used as agricultural dusts, or the like. Also, the concentrates comprising the alkaloid fraction may be dissolved in any of a wide variety of solvents to form solutions or sprays. For example, alcohol solutions may be used, or aqueous dilutions of such solutions may be used. Where it is desired to utilize our new insecticides against plant pests, the foliage of the plants may be sprinkled with the concentrates, or may be sprayed with solutions thereof.

Our Ryania products have been found to be highly effective against insects such as cockroaches and against the milkweed bug, *Oncopeltes fasciatus*, the squash bug, *Anasa tristis*, Japanese beetles (*Popillia japonica*), silkworms (*Bombyx mori*), and potato aphids (*Illinoia solenifolii*). Their use is also indicated against meal worms (*Tenebrio molitor*), potato beetles (*Leptinotarsa decemlineata*), Mexican bean beetle (*Epilaehna varivestis*), asparagus beetles (*Cri-*

*oceris asparagi*), elm-leaf beetles (*Galerucella xanthomelaena*), imported cabbage worms (*Ascia rapae*), cabbage loopers (*Autographa brassicae*), corn ear worms (*Heliothis obsoleta*), etc.

The Ryania alkaloids of our invention are of such great potency as insecticides, that relatively small amounts thereof may be employed with large amounts of water or other liquid carriers, with eminently satisfactory results.

Our Ryania alkaloids possess properties which are especially valuable in an insecticide and/or insect-repellent. Thus, the crude alkaloidal material is organic and almost ash-free and, therefore, will not produce the cumulative toxic effects associated with inorganic spray ingredients, such as lead arsenate. The Ryania alkaloids are soluble in a wide range of solvents, including water and ether, from which they may be applied, as hereinbefore disclosed. Our Ryania products comprising the crude alkaloids may also be compounded with amorphous adsorbents of the type of silica, and alumina preparations, or similar substances, such as are used to give bulk and surface to insecticide compositions, to give agricultural dusts or the like. The extracts comprising the Ryania alkaloids are non-volatile and show good light stability in air. Other organic insecticide ingredients, such as tobacco, pyrethrum, and derris extractives, are not effective for comparable periods of time.

The representative species of Ryania mentioned in the examples given here, are identified by means of numbers. The identification numerals used in this application are identical to numerals applied to corresponding botanical specimens of Ryania species, and these botanical specimens are on file in the permanent collection of the New York Botanical Gardens. The numerals and present names of species of Ryania disclosed herein, correspond as follows:

| | |
|---|---|
| R. speciosa | 9564, 9924, 15180, 15417 |
| R. tomentosa | 15253, 15358 |
| R. pyrifera | 15280 |
| R. acuminata | 15376 |
| R. sagotiana | 15374 |
| R. subuliflora | 9880, 15008, 15150 |

The following examples illustrate methods of carrying out the present invention, but it is to be understood that these examples are given by way of illustration and not of limitation. The products of our invention have been subjected to various tests for activity, such as tests which simulate actual working conditions as well as the routine laboratory tests for proving and estimating insecticidal action, such as bloodstream injection tests, and stomach, contact and dust tests. The bloodstream injection test is a technique which permits rapid preliminary tests and assay work. In order to illustrate the insecticidal activity of our Ryania products, the following examples are given. These examples include descriptions of certain tests against a few varieties of insect, and are given by way of exemplification and not of limitation.

Example I 25 lbs. of finely ground root of Ryania #15180 are extracted by stirring at room temperature for 10 hour periods with three successive 12 gal. volumes of water. The combined filtrates are concentrated in vacuo to 6230 cc. volume, and extracted continuously with ether for 96 hours. 19.333 gms. of residue are obtained upon evaporation in vacuo of extract solvent. The material is dissolved in alcohol to give 74 cc. solution; 1 cc.=262 mgms. of the above residue.

This material has been tested as follows:

Adults of the American cockroach, *Periplaneta americana*, were injected in the bloodstream with an aqueous dilution of the alcohol solution. With a dosage of 25 mgms. of extractives per kg. of body weight, 100% of the females were paralyzed within one day and 100% were dead in 6 days. With a dosage of 0.5 mgm. of extractives per kg. of body weight, 100% of the males were paralyzed within one day and 100% were dead in 6 days.

Example II 50 gms. of well-ground stem bark of Ryania #15180 are extracted by stirring at room temperature for 10 hour periods with successive 400 and 300 cc. volumes of water. The filtered extracts are combined and concentrated to approximately 100 cc. volume, then extracted continuously with ether for 48 hours. The wet ether extract gives 0.490 gm. product. This is made up to 5 cc. solution with 95% alcohol; 1 cc.=98 mgms. extractive.

This material has been tested as follows:

Adults of the milkweed bug, *Oncopeltes fasciatus*, were chilled to dormancy and the alcohol solution was deposited in small measured quantities on the ventral thoracic surfaces of the bugs. With a dosage of 450 mgms. of extractives per kg. of body weight, 20% of the bugs were paralyzed within one day, while in six days, 40% were dead and an additional 30% were paralyzed.

Adults of the German cockroach, *Blatella germanica*, were chilled to dormancy and the alcohol solution was applied in small measured quantities to the ventral thoracic surfaces of the roaches. With the females a dosage of 100 mgms./kg. produced 90% paralysis in one day and in four days, 60% were dead and an additional 10% were paralyzed. With the males, a dosage of 100 mgms./kg. produced 20% paralysis in one day, and in four days 90% were dead.

Example III 100 gms. of finely ground root of Ryania #15253 are extracted by stirring at room temperature for 8 hour periods with three successive 800 cc. volumes of water. The combined extracts are concentrated in vacuo to 150 cc. and then extracted in a separatory funnel with twenty 50 cc. volumes of ether. Evaporation in vacuo of the ether solution gives 0.357 gm. residue. This is dissolved in alcohol to give 7.5 cc. solution; 1 cc.=47 mgms.

The product has been tested as follows:

Adults of the German cockroach, *Blatella germanica*, were chilled to dormancy and the alcohol solution was deposited in small measured quantities on the ventral thoracic surfaces of the roaches. With a dosage of 200 mgms. of principles per kg. of body weight, 90% of the females were paralyzed within one day and 100% were dead in 4 days. With a dosage of 200 mgms./kg., 80% of the males were paralyzed within one day, and 100% were dead within 4 days.

Adults of the American cockroach, *Periplaneta americana*, were injected in the bloodstream with an aqueous dilution of the alcohol solution. With a dosage of 20 mgms. of extractives per kg. of body weight, 100% of the females were paralyzed within one day, and 80% were dead in 6 days. With a dosage of 4 mgms. of extractives per kg. of body weight, 100% of the males were paralyzed within one day, and 100% were dead in 6 days.

Example IV 50 gms. of finely ground root of Ryania #15180 are thoroughly mixed and wet with 100 cc. of water. The material is then placed in a Soxhlet extraction bag fitted with a solvent distributor. The wet root is extracted for 16 hours with ethylene dichloride. The water and ethylene dichloride layers of the extract solution are separated and the latter are evaporated to dryness in vacuo, giving 0.429 gm. residue. This is dissolved in alcohol to give 10 cc. solution; 1 cc. = 42.9 mgms.

The product has been tested as follows:

Adults of the German cockroach, Blatella germanica, were chilled to dormancy and the alcohol dilution of Ryania #15180 extract was deposited in small measured quantities on the ventral thoracic surfaces of the roaches. With a dosage of 50 mgms. of principles per kg. of body weight, 80% of the females were paralyzed within one day and 60% were dead in 4 days. With a dosage of 50 mgms./kg., 70% of the males were paralyzed within one day and 100% were dead within 4 days.

Adults of the milkweed bug, Oncopeltes fasciatus, were chilled to dormancy and the alcohol solution of Ryania #15180 extract was deposited in small measured quantities on the ventral thoracic surfaces of the bugs. With a dosage of 28 mgms. of extractives per kg. of body weight, 50% of the bugs were paralyzed within one day, while in 6 days 50% were dead.

Adults of the American cockroach, Periplaneta americana, were injected in the bloodstream with an aqueous dilution of Ryania #15180 extract. With a dosage of 15 mgms. of extractives per kg. of body weight, 100% of the females were paralyzed within one day and 87.5% were dead in 6 days. With a dosage of 0.5 mgm. of extractives per kg. of body weight, 80% of the males were paralyzed within one day and 80% were dead in 6 days.

Example V 50 gms. of finely ground root of Ryania #15180 are thoroughly mixed and wet with 100 cc. of water. The material is then placed in a Soxhlet extraction bag fitted with a solvent distributor. The wet root is extracted for 18 hours with chloroform. The water and chloroform layers are separated and the latter is evaported to dryness in vacuo, giving 0.477 gm. residue. This is dissolved in alcohol to give 10 cc. solution; 1 cc. = 47.7 gms.

The product has been tested as follows:

Adults of the German cockroach, Blatella germanica, were chilled to dormancy and the alcohol dilution of Ryania #15180 extract was deposited in small measured quantities on the ventral thoracic surfaces of the roaches. With a dosage of 100 mgms. of principles per kg. of body weight, 80% of the females were paralyzed within one day and 70% were dead in 4 days. With a dosage of 100 mgms./kg., 90% of the males were paralyzed within one day and 80% were dead within 4 days.

Adults of the milkweed bug, Oncopeltes fasciatus, were chilled to dormancy and the alcohol solution of Ryania #15180 extract was deposited in small measured quantities on the ventral thoracic surfaces of the bugs. With a dosage of 112.5 mgms. of extractives per kg. of body weight, 30% of the bugs were paralyzed within one day, while in 6 days 50% were dead and an additional 30% were paralyzed.

Adults of the American cockroach, Periplaneta americana, were injected in the bloodstream with an aqueous dilution of the above Ryania #15180 extract. With a dosage of 25 mgms. of extractives per kg. of body weight, 90% of the females were paralyzed within one day and 70% were dead in 6 days. With a dosage of 0.5 mgm. of extractives per kg. of body weight, 60% of the males were paralyzed within one day and 70% were dead in 6 days.

Example VI 100 gms. of finely ground stem of Ryania #15358 are thoroughly mixed and wet with 175 cc. of water. The material is placed in a Soxhlet extraction apparatus fitted with a solvent distributor. The wet root is then extracted with chloroform for 25 hours. The filtered extract is then evaporated to dryness in vacuo, giving 493 mgms. residue. This is dissolved in alcohol to give 10 cc. solution; 1 cc.=49 mgms.

This product has been tested as follows:

Adults of the German cockroach, Blatella germanica, were chilled to dormancy and the alcohol dilution of Ryania #15358 extract was deposited in small measured quantities on the ventral thoracic surfaces of the roaches. With a dosage of 200 mgms. of principles per kg. of body weight, 60% of the females were paralyzed within one day and 30% were dead in 4 days. With a dosage of 200 mgms./kg., 50% of the males were paralyzed within one day and 90% were dead within 4 days.

Adults of the milkweed bug, Oncopeltes fasciatus, were chilled to dormancy and the alcohol solution of Ryania #15358 extract was deposited in small measured quantities on the ventral thoracic surfaces of the bugs. With a dosage of 225 mgms. of extractives per kg. of body weight, 30% of the bugs were paralyzed within one day, while in 6 days 10% were dead and an additional 20% were paralyzed.

Adults of the American cockroach, Periplaneta americana, were injected in the bloodstream with an aqueous dilution of the above Ryania #15358 extract. With a dosage of 25 mgms. of extractives per kg. of body weight, 90% of the females were paralyzed within one day and 10% were dead in 6 days. With a dosage of 1.5 mgms. of extractives per kg. of body weight, 10% of the males were dead in 6 days.

Examples VII 50 gms. of finely ground stem of Ryania #15358 are thoroughly mixed and wet with 100 cc. of water. The material is placed in a Soxhlet extraction bag fitted with a solvent distributor. The wet root is then extracter with ether for 25 hours. The filtered extract is then evaporated in vacuo to dryness, giving 484 mgms. residue. This is dissolved in alcohol to give 10 cc. solution; 1 cc.=48 mgms.

This product has been tested as follows:

Adults of the German cockroach, Blatella germanica, were chilled to dormancy and the alcohol dilution of Ryania #15358 extract was deposited in small measured quantities on the ventral thoracic surfaces of the roaches. With a dosage of 200 mgms. of principles per kg. of body weight, 40% of the females were paralyzed within one day and 40% were dead in 4 days. With a dosage of 200 mgms./kg., 30% of the males were paralyzed within one day and 70% were dead within 4 days.

Adults of the milkweed bug, Oncopeltes fasciatus, were chilled to dormancy and the alcohol solution of Ryania #15358 extract was deposited in small measured quantities on the ventral thoracic surfaces of the bugs. With a dosage of 112.5 mgms. of extractives per kg. of body weight, 20% of the bugs were paralyzed within one day, while in 6 days, 30% were dead and an additional 10% were paralyzed.

Adults of the American cockroach, *Periplaneta americana*, were injected in the bloodstream with an aqueous dilution of the above Ryania #15358 extract. With a dosage of 25 mgms. of extractives per kg. of body weight, 100% of the females were paralyzed within one day and 10% were dead in 6 days. With a dosage of 1.5 mgms. of extractives per kg. of body weight, 20% of the males were paralyzed within one day and 50% were dead in 6 days.

Example VIII 50 gms. of finely ground root of Ryania #15180 are thoroughly mixed and wet with 100 cc. of water. The material is then placed in a Soxhlet extraction bag fitted with a solvent distributor. The wet root is extracted with ether for 10 hours. The water and ether layers of the extract solution are separated and the latter is evaporated to dryness in vacuo, giving 451 mgms. residue. This is dissolved in alcohol to give 18 cc. solution;

1 cc.=25 mgms.

This product has been tested as follows:

Adults of the American cockroach, *Periplaneta americana*, were injected in the bloodstream with an aqueous dilution of the above Ryania #15180 extract. With a dosage of 25 mgms. of extractives per kg. of body weight, 100% of the females were paralyzed within one day and 50% were dead in 6 days. With a dosage of 1.5 mgms. of extractives per kg. of body weight, 100% of the males were paralyzed within one day, and 80% were dead in 6 days.

Example IX 50 gms. of finely ground root of Ryania #15180 are thoroughly mixed and wet with 100 cc. of water. The material is then placed in a Soxhlet extraction bag fitted with a solvent distributor. The wet root is then extracted with benzene for 16 hours. The water and benzene layers of the extract solution are separated and the latter is evaporated to dryness in vacuo, giving 188 mgms. residue. This is dissolved in alcohol to give 10 cc. solution; 1 cc.=18.8 mgms.

This product has been tested as follows:

Adults of the American cockroach, *Periplaneta americana*, were injected in the bloodstream with an aqueous dilution of the above Ryania =15180 extract. With a dosage of 15 mgms. of extractives per kg. of body weight, 100% of the females were paralyzed within one day and 10% were dead in 6 days. With a dosage of 1.5 mgms. of extractives per kg. of body weight, 100% of the males were paralyzed within one day and 90% were dead in 6 days.

Example X 200 gms. of finely ground root of Ryania #15280 are thoroughly mixed and wet with 350 cc. of water. The material is placed in a Soxhlet extractor bag fitted with a solvent distributor. The wet root is extracted with chloroform for 50 hours in a Soxhlet apparatus. The filtered extract is evaporated to dryness in vacuo, giving 1.6158 gms. residue. This is dissolved in alcohol to give a concentration of 51.5 mgms. per cc.

The product thus obtained has been tested as follows:

Adults of the American cockroach, *Periplaneta americana*, were injected in the bloodstream with an aqueous dilution of the Ryania #15280 extract. With a dosage of 15 mgms. of extractives per kg. of body weight, 100% of the females were paralyzed within one day and 70% were dead in 6 days. With a dosage of 1.5 mgms. of extractives per kg. of body weight, 100% of the males were paralyzed within one day and 100% were dead in 6 days.

Example XI 50 gms. of finely ground root of Ryania #15180 are thoroughly mixed and wet with 100 cc. of water. The material is placed in a Soxhlet extraction bag fitted with a solvent distributor. The wet wood is extracted with dioxane for 16 hours in a Soxhlet apparatus. The filtered extract is evaporated to dryness and the residue taken up in 30 cc. of alcohol. The alcohol solution is run slowly into 100 cc. vigorously stirred water. The aqueous-alcohol solution is filtered, concentrated to 80 cc. volume, and then extracted continuously with ether for 48 hours. 1.569 gms. product is obtained from the wet ether extract. This is made up to 7 cc. with 95% alcohol; 1 cc.= 224 mgms. extractive.

The product thus obtained has been tested as follows:

Adults of the milkweed bug, *Oncopeltes fasciatus*, were chilled to dormancy and the alcohol solution of Ryania #15180 extract was deposited in small measured quantities on the ventral thoracic surfaces of the bugs. With a dosage of 450 mgms. of extractives per kg. of body weight, 50% of the bugs were paralyzed within one day, while in six days, 50% were dead and an additional 30% were paralyzed.

Adults of the German cockroach, *Blatella germanica*, were chilled to dormancy and the alcohol solution of Ryania #15180 extract was applied in small measured quantities to the ventral thoracic surfaces of the roaches. With the females, a dosage of 400 mgms./kg. produced 90% paralysis in one day, and in 4 days, 50% were dead and an additional 30% were paralyed. With the males, a dosage of 400 mgms./kg. produced 70% paralysis in one day, and in 4 days 80% were dead and additional 10% were paralyzed.

Example XII 50 gms. of finely ground root of Ryania #15180 are thoroughly mixed and wet with 100 cc. of water. The material is placed in a Soxhlet extraction bag fitted with a solvent distributor. The wet wood is extracted with ethyl acetate for 16 hours in a Soxhlet apparatus. The filtered extract is evaporated to dryness and the residue taken up in 26 cc. of alcohol. The alcohol solution is run slowly into 100 cc. vigorously stirred water. The aqueous-alcohol solution is filtered, concentrated to 80 cc. volume and then extracted continuously with ether for 48 hours. 0.428 gm. product is obtained from the wet ether extract. This is made up to 5 cc. with 95% alcohol; 1 cc.=86 mgms. extractive.

The product has been tested as follows:

Adults of the milkweed bug, *Oncopeltes fasciatus*, were chilled to dormancy and the alcohol solution of Ryania #15180 extract was deposited in small measured quantities on the ventral thoracic surfaces of the bugs. With a dosage of 450 mgms. of extractives per kg. of body weight, 50% of the bugs were paralyzed within one day, while in 6 days, 50% were dead and an additional 30% were paralyzed.

Adults of the German cockroach, Blatella germanica, were chilled to dormancy and the alcohol solution of Ryania #15180 extract was applied in small measured quantities to the ventral thoracic surfaces of the roaches. With the females, a dosage of 100 mgms./kg. produced 40% paralysis in one day, and in 4 days 30% were dead and an additional 70% were paralyzed. With the males, a dosage of 100 mgms./kg. produced 40% paralysis in one day, and in 4 days, 90% were dead, and an additional 10% were paralyzed.

*Example XIII*

100 gms. of finely ground root of Ryania #15180 are thoroughly mixed and wet with 180 cc. of water. The wet root is then extracted with acetone for 19 hours in a Soxhlet apparatus. The extract is filtered, concentrated in vacuo to 100 cc., filtered, adjusted to pH 6 with sodium bicarbonate and divided into two equal portions for 50 cc. volume.

(a) One portion is extracted continuously with chloroform for 15 hours, given 273 mgms. residue upon evaporation of the extract in vacuo. This is dissolved in alcohol to give 10 cc. solution; 1 cc.=27.3 mgms.

(b) The other portion is extracted continuously with ethylene dichloride for 15 hours giving 329 mgms. residue upon evaporation of the extract in vacuo. This is dissolved in alcohol to give 10 cc. solution; 1 cc.=32.9 mgms.

The two products thus obtained were tested as follows:

Adults of the American cockroach, Periplaneta americana, were injected in the bloodstream with an aqueous dilution of the water-acetone chloroform Ryania #15180 extract. With a dosage of 15 mgms. of extractives per kg. of body weight, 100% of the females were paralyzed within one day and 70% were dead in 6 days. With a dosage of 1.5 mgms. of extractives per kg. of body weight, 100% of the males were paralyzed within one day and 100% were dead in 6 days.

Adults of the American cockroach, Periplaneta americana, were injected in the bloodstream with an aqueous dilution of the water-acetone-ethylene dichloride Ryania #15180 extract. With a dosage of 25 mgms. of extractives per kg. of body weight, 100% of the females were paralyzed within one day and 80% were dead in 6 days. With a dosage of 1.5 mgms. of extractives per kg. of body weight, 100% of the males were paralyzed within one day, and 80% were dead in 6 days.

*Example XIV*

10 gms. of finely ground root of Ryania #15180 are thoroughly mixed and wet with 175 cc. of water. The wet root is then extracted with methanol for 18 hours in a Soxhlet apparatus. The extract is filtered, concentrated in vacuo to 75 cc. volume, and again filtered. The filtrate is diluted to 100 cc. volume, and again filtered. The filtrate is diluted to 100 cc. volume with water and the pH is raised to 6.0 with sodium bicarbonate. The solution is then extracted continuously with ether for 48 hours. The water and ether layers in the extract solution are separated and the latter evaporated in vacuo, giving 498 mgms. residue.

*Example XV*

100 gms. of finely ground root of Ryania #15180 are thoroughly mixed and wet with 150 cc. of water. The wet root is then extracted with acetone for 18 hours in a Soxhlet apparatus. The filtered extract is concentrated in vacuo to approximately 110 cc. volume, filtered from precipitated material, further concentrated in vacuo to 29 cc., diluted to 100 cc. with water and adjusted to pH 6. The aqueous solution is then extracted continuously with ether for 48 hours. Evaporation of the extract solution gave 591 mgms. residue. This is dissolved in alcohol to give 10 cc. solution; 1 cc.=59 mgms.

The product has been tested as follows:

Adults of the German cockroach, Blatella germanica, were chilled to dormancy and the alcohol dilution of Ryania #15180 extract was deposited in small measured quantities on the ventral thoracic surfaces of the roaches. With a dosage of 60 mgms. of principles per kg. of body weight, 70% of the females were paralyzed within one day and 80% were dead in 4 days. With a dosage of 60 mgms./kg., 70% of the males were paralyzed within one day and 90% were dead in 4 days.

Adults of the American cockroach, Periplaneta americana, were injected in the bloodstream with an aqueous dilution of the above Ryania #15180 extract. With a dosage of 20 mgms. of extractives per kg. of body weight, 100% of the females were paralyzed within one day and 70% were dead in 6 days. With a dosage of 1.5 mgms. of extractives per kg. of body weight, 100% of the males were paralyzed within one day and 80% were dead in 6 days.

*Example XVI*

1000 gms. of finely ground root of Ryania #15280 are thoroughly mixed and wet with 2 liters of water. The material is placed in a Soxhlet extractor bag fitted with a solvent distributor. The wet root is extracted with chloroform for 52 hours in a Soxhlet extractor. The filtered extract is concentrated to approximately 1800 cc.; when all the chloroform is removed, the pH is adjusted to 9.0 with sodium carbonate and the solution then extracted continuously with ether for 45 hours. Removal of the solvent in vacuo gives 4.557 gms. extract residue. This is dissolved in alcohol to give a concentration of 100 mgms. residue per cc.

This product has been tested as follows:

Adults of the German cockroach, Blatella germanica, were chilled to dormancy and the alcohol dilution of Ryania #15280 extract was deposited in small measured quantities on the ventral thoracic surfaces of the roaches. With a dosage of 100 mgms. of principles per kg. of body weight, 80% of the females were paralyzed within one day and 90% were dead in 4 days. With a dosage of 100 mgms. of principles per kg. of body weight, 80% of the males were paralyzed within one day and 90% were dead within 4 days.

Adults of the milkweed bug, Oncopeltes fasciatus, were chilled to dormancy and the alcohol solution of Ryania #15280 extract was deposited in small measured quantities on the ventral thoracic surfaces of the bugs. With a dosage of 225 mgms. of extractives per kg. of body weight, 70% of the bugs were paralyzed within one day, while in 6 days, 70% were dead and an additional 20% were paralyzed.

Adults of the American cockroach, Periplaneta americana, were injected in the bloodstream with an aqueous dilution of the above Ryania #15280 extract. With a dosage of 25 mgms. of extractives per kg. of body weight, 100% of the females were paralyzed within one day and 40% were dead in 6 days. With a dosage of 1.5 mgms. of extractives per kg. of body weight, 20% of the males were paralyzed within one day and 30% were dead in 6 days.

*Example XVII*

862 gms. of finely ground root of Ryania #15374 are thoroughly mixed and wet with 175 mls. of water. The material is placed in a Soxhlet extractor bag fitted with a solvent distributor. The wet root is extracted with acetone for 40 hours in a Soxhlet extractor. The filtered extract is concentrated to 1500 mls. and then filtered. The clear solution is extracted continuously with ethyl ether for 50 hours. The ether solution on being taken to dryness yields 5.9880 gms. of residue (0.69%).

1.6596 gms. were dissolved in 25 mls. 95% ethanol (1 cc.=66 mgms. extractive), and tested as follows:

Adults of the milkweed bug, *Oncopeltes fasciatus*, were chilled to dormancy and some of the alcohol solution of Ryania #15374 extract was deposited in small measured quantities on the ventral thoracic surfaces of the bugs. With a dosage of 450 mgms. of extractives per kg. of body weight, 20% of the bugs were paralyzed within one day, while in six days 40% were dead.

Adults of the German cockroach, *Blatella germanica*, were chilled to dormancy and some of the alcohol solution of Ryania #15374 extract was applied in small measured quantities to the ventral thoracic surfaces of the roaches. With the females, a dosage of 200 mgms./kg. resulted in 60% paralyzed in one day, and in 4 days, 80% were dead. With the males, a dosage of 200 mgms./kg. resulted in 30% paralyzed in one day, and in 4 days, 90% were dead.

Adults of the American cockroach, *Periplaneta americana*, were injected in the bloodstream with an aqueous dilution of the above Ryania #15374 extract. With a dosage of 15 mgms. of extractives per kg. of body weight, 100% of the females were paralyzed within one day and 20% were dead in 6 days. With a dosage of 1.5 mgms. of extractives per kg. of body weight, 30% of the males were paralyzed within one day and 30% were dead in 6 days.

*Example XVIII*

200 gms. of well ground root of Ryania #15376 are thoroughly mixed and wet with 350 cc. of water. The material is placed in an extractor bag fitted with a solvent distributor. The wet root is extracted with acetone for 50 hours in a Soxhlet apparatus. The filtered extract is concentrated to a volume of 300 cc. and the pH is adjusted to 9.0. The concentrate is extracted continuously with ether for 72 hours. The wet ether extract yields 1.053 gms. product. The extractive is made up to 95% alcohol solution; 1 cc.=100 mgms.

The product was tested as follows:

Adults of the milkweed bug, *Oncopeltes fasciatus*, were chilled to dormancy and some of the alcohol solution of Ryania #15376 extract was deposited in small measured quantities on the ventral thoracic surfaces of the bugs. With a dosage of 450 mgms. of extractives per kg. of body weight, 30% of the bugs were paralyzed within one day, while in 6 days, 20% were dead and an additional 20% were paralyzed.

Adults of the German cockroach, *Blatella germanica*, were chilled to dormancy and some of the alcohol solution of Ryania #15376 extract was applied in small measured quantities to the ventral thoracic surfaces of the roaches. With the females, a dosage of 200 mgms./kg. paralyzed 50% in one day, and in 4 days, 90% were dead. With the males, a dosage of 200 mgms./kg. paralyzed 20% in one day, and in 4 days, 100% were dead.

Adults of the American cockroach, *Periplaneta americana*, were injected in the bloodstream with an aqueous dilution of the above Ryania #15376 extract. With a dosage of 15 mgms. of extractives per kg. of body weight, 100% of the females were paralyzed within one day and 20% were dead in 6 days. With a dosage of 1.5 mgms. of extractives per kg. of body weight, 30% of the males were paralyzed within one day and 30% were dead in 6 days.

*Example XIX*

100 gms. of finely ground root of Ryania #15180 are extracted with methanol for 18 hours in a Soxhlet apparatus. The filtered extract is concentrated to approximately 35 cc. volume and then run slowly into 200 cc. well-stirred water. The aqueous alcohol solution is chilled over night, filtered, and concentrated to 75 cc. The concentrate is made up to 100 cc. volume, brought to pH 6 with sodium bicarbonate and extracted continuously with ether for 42 hours. The wet ether extract gives 0.471 gm. product. This is made up to 10 cc. solution with 95% alcohol; 1 cc.=47.1 mgms. extractive.

The product was tested as follows:

Adults of the German cockroach, *Blatella germanica*, were chilled to dormancy and some of the alcohol dilution of Ryania #15180 extract was deposited in small measured quantities on the ventral thoracic surfaces of the roaches. With a dosage of 60 mgms. of principles per kg. of body weight, 80% of the females were paralyzed within one day, and 80% were dead in 4 days. With a dosage of 60 mgms./kg., 100% of the males were paralyzed within one day and 100% were dead within 4 days.

Adults of the American cockroach, *Periplaneta americana*, were injected in the bloodstream with an aqueous dilution of the above Ryania #15180 extract. With a dosage of 20 mgms. of extractives per kg. of body weight, 100% of the females were paralyzed within one day and 90% were dead in 6 days. With a dosage of 1.5 mgms. of extractives per kg. of body weight, 100% of the males were paralyzed within one day and 90% were dead in 6 days.

*Example XX*

100 gms. of finely ground root of Ryania #15280 are thoroughly mixed and wet with 175 cc. of water. The material is placed in a Soxhlet extractor bag fitted with a solvent distributor. The wet root is extracted with acetone for 18 hours in a Soxhlet extractor. The filtered extract is concentrated to 125 cc. volume, the pH is adjusted to 6.0 and the solution extracted continuously with chloroform for 14 hours, then with ether for 50 hours more. The extracts, which weigh 245.6 and 89.8 mgms., are combined to give 335.4 mgms. total residue. This is dissolved in alcohol to give a concentration of 50 mgms. per cc.

The product has been tested as follows:

Adults of the American cockroach, *Periplaneta americana*, were injected in the bloodstream with an aqueous dilution of the above Ryania #15280 extract. With a dosage of 25 mgms. of extractives per kg. of body weight, 100% of the females were paralyzed within one day and 40% were dead in 6 days. With a dosage of 1.5 mgms. of extractives per kg. of body weight, 40% of the males were paralyzed within one day and 30% were dead in 6 days.

Example XXI 10 gms. of ground root of Ryania #9564 are pulverized and agitated with 80 cc. of water in a ball mill for 12 hours. The product is centrifuged; the resultant clear liquor has been tested as follows (1 cc. water extract=0.125 gm. root).

Adults of the German cockroach, *Blatella germanica*, were immersed for two minutes in aqueous extract containing the extractives from 1 gm. of root in 8 cc. of water. In 4 days, 80% of the roaches were dead.

Adults of the cockroach, *Periplaneta americana*, were injected in the bloodstream with an amount of the aqueous extract sufficient to give a dosage of the extractives from 2 gms. of root/kg. body weight. Within one day, 100% of the roaches were paralyzed, and in six days 100% were dead.

Adults of the cockroach, *Periplaneta americana*, were injected in the stomach with an amount of the aqueous extract sufficient to give a dosage of the extractives from 12.5 gms. of root/kg. body weight. In 3 days, 100% of the roaches were paralyzed; in 6 days 100% were dead.

Example XXII 166 gms. of well ground root of Ryania #9924 are extracted with 95% ethanol in a Soxhlet apparatus, for 48 hours, at which time extraction is complete. The extract is filtered into a round-bottomed flask, and then concentrated in vacuo (30–40 mm.), with gentle warming on the steam bath to a thick syrup. The flask is then connected to an oil vacuum pump, and the remaining solvent removed by ½ hour evaporation at 1–2 mm. pressure, and approximately 50° C. The solvent residue, a brown amorphous powder, weighs 13.215 gms. It is dissolved in sufficient 95% alcohol to make 53 cc. of solution; 1 cc. alcohol solution=250 mgms. residue.

The product has been tested as follows:

Adults of the American cockroach, *Periplaneta americana*, were injected in the bloodstream with an aqueous dilution of the alcohol solution. With a dose of 160 mgms. extractives per kg. of body weight, 100% of the females were paralyzed within one day, and in 6 days, 80% were dead.

With a dose of 60 mgms. extractives per kg. of body weight, 100% of the males were paralyzed in 2 days; in 6 days, 80% were dead.

Adults of the German cockroach, *Blatella germanica*, were chilled to dormancy, and small measured quantities of the alcohol solution were deposited on their ventral thoracic surfaces. With a dose of 800 mgms. extractives per kg. of body weight, 75% were dead in 4 days, and 7.5% of the remaining roaches were paralyzed.

Example XXIII 10 gms. of ground root of Ryania #9564 are shaken with 30 cc. of 95% alcohol for 75 hours. The decanted solution is centrifuged and the clear liquor was tested as follows (1 cc. alcohol extract=0.33 gm. root):

Adults of the German cockroach, *Blatella germanica*, were chilled to dormancy and small measured quantities of the alcohol extract were deposited on their ventral thoracic surfaces. With a dose of the extractives from 13.3 gms. of root per kg. of body weight, 85% were dead in 4 days.

Last-instar nymphs of the cockroach, *Blatella germanica*, were placed in cylindrical wire-screen cages and were sprayed with the alcohol extract. In 6 days, 65% were dead, and 10% of the remaining roaches were paralyzed.

Example XXIV 170 gms. of well ground root of Ryania #9924 are extracted with acetone in a Soxhlet apparatus for 48 hours, at which time extraction is complete. The extract is filtered into a round-bottomed flask and then concentrated in vacuo (30–40 mm.) with gentle warming on the steam bath, to a thick syrup. The flask is next connected to an oil vacuum pump, and the remaining solvent removed by ½ hour evaporation at 1–2 mm. pressure, and approximately 50° C. The solvent residue is a brown, amorphous powder. It weighs 6.372 gms. It is dissolved in sufficient 95% alcohol to make 32 cc. volume of solution (1 cc. alcohol solution=199 mgms. residue).

The product has been tested as follows:

Adults of the American cockroach, *Periplaneta americana*, were injected in the bloodstream with an aqueous dilution of the alcohol solution. With a dosage of 150 mgms. acetone extractives per kg. of body weight, 90% of the females were dead in 6 days. With a dosage of 18.8 mgms. acetone extractives per kg. of body weight, 90% of the males were dead in 6 days.

Adults of the German cockroach, *Blatella germanica*, were chilled to dormancy and small, measured quantities of the alcohol solution of acetone extractives were deposited on their ventral thoracic surfaces. With a dosage of 376 mgms. extractives per kg. of body weight, 70% were dead in 4 days.

Example XXV 100 gms. of well ground root of Ryania #9880 are extracted with ether in a Soxhlet apparatus for 48 hours, at which time extraction is completed. The extract is filtered into a round-bottomed flask and concentrated in vacuo (30–40 mm.) with gentle warming in a water-bath, to a thick syrup. The flask is then connected to an oil vacuum pump and removal of the solvent completed at 1–2 mm. pressure in ½ hour. 0.666 gm. of light-brown amorphous powder is obtained, and made up to 6.6 cc. solution with 95% alcohol; 1 cc. alcohol solution=100 mgms. residue.

The product has been tested as follows:

Adults of the German cockroach, *Blatella germanica*, were chilled to dormancy and small measured quantities of the alcohol solution were deposited on their ventral thoracic surfaces. With a dosage of 700 mgms. extractives per kg. of body weight, 66% were dead in 4 days.

Example XXVI 30 gms. of well ground root of Ryania #15150 are extracted with chloroform in a Soxhlet apparatus for 48 hours, at which time extraction is complete. The extract is filtered into a round-bottomed flask and concentrated in vacuo (30–40 mm.) with gentle warming on a steam bath, to a thick syrup. The flask is then connected to an oil vacuum pump, and removal of the solvent completed by evaporation for ½ hour at 1–2 mm. and 50° C. 17 mgms. of light-brown, amorphous powder are obtained. This is made up to 0.85 cc. volume with 95% alcohol; 1 cc. alcohol solution =20 mgms. residue.

The product has been tested as follows:

Adults of the German cockroach, *Blatella germanica,* were chilled to dormancy and small measured quantities of the alcohol solution were deposited on their ventral thoracic surfaces. With a dosage of 400 mgms. extractives per kg. of body weight, 80% of the roaches were paralyzed within one day; in 4 days, 85% were dead.

Example XXVII 25.6 gms. of well ground root of Ryania #15150 are treated with ethyl acetate in a Soxhlet apparatus for 48 hours. The extract is filtered into a round-bottomed flask and concentrated in vacuo (30–40 mm.) with gentle warming on a steam bath, to a thick syrup. The flask is then connected with an oil vacuum pump, and removal of the solvent is completed by evaporation for ½ hour at 1–2 mm., and 50° C.

75 mgms. of light-tan amorphous powder are obtained, and dissolved in sufficient 95% alcohol to give 1.6 cc. of solution; 1 cc. alcohol solution =46.9 mgms. residue.

The product has been tested as follows:

Adults of the German cockroach, *Blatella germanica* were chilled to dormancy, and small measured quantities of the alcohol solution of the ethyl acetate extract were deposited on their ventral thoracic surfaces. With a dosage of 470 mgms. of extractive per kg. of body weight, 65% of the roaches were paralyzed within one day; in 4 days, 85% were dead.

Example XXVIII 30 gms. of well ground root of Ryania #15008 are treated with benzene in a Soxhlet apparatus for 20 hours, at which time extraction is complete. The extract is filtered into a round-bottomed flask, and concentrated in vacuo (30–40 mm.) with gentle warming on a steam bath to a thick syrup. The flask is then connected to an oil pump and removal of the solvent is completed by evaporation for ½ hour at 1–2 mm., and 50° C. 180 mgms. of a light-tan amorphous powder are obtained. This is dissolved in sufficient 95% alcohol to give 2.3 cc. solution; 1 cc. alcohol solution=78.3 mgms. residue.

The product has been tested as follows:

Adults of the German cockroach, *Blatella germanica,* were chilled to dormancy and small measured quantities of the alcohol solution were deposited on their ventral thoracic surfaces. With a dosage of 780 mgms. extractive per kg. of body weight, 100% of the roaches were paralyzed within one day; in four days, 100% were dead.

Example XXIX 100 gms. of well ground root of Ryania #15008 are extracted with ethylene dichloride in a Soxhlet apparatus for 48 hours, at which time extraction is complete. The extract is filtered into a round-bottomed flask and concentrated in vacuo (30–40 mm.), with gentle warming on a steam bath, to a thick syrup. The flask is then connected with an oil vacuum pump and removal of the solvent is completed by evaporation for ½ hour, at 1–2 mm., and at 50° C. 1.061 gms of a light-brown amorphous powder are obtained. This is dissolved in sufficient alcohol to give 10 cc. of solution; 1 cc. alcohol solution=106 mgms. residue.

The product has been tested as follows:

Adults of the German cockroach, *Blatella germanica,* were chilled to dormancy and small measured quantities of the alcohol solution were deposited on their ventral thoracic surfaces. With a dosage of 200 mgms. extractives per kg. of body weight, 75% were dead in 4 days.

Example XXX

One kgm. of ground root of Ryania #9924 are extracted with 95% alcohol in a Soxhlet apparatus for 48 hours. The extract is filtered and concentrated to 140 cc. 28 cc. of this concentrate are evaporated to dryness in vacuo, giving 5.567 gms. residue. The residue is extracted with two 50 cc. and two 25 cc. volumes of acetone. The acetone is evaporated and the residue thus obtained, 3.426 gms., is dissolved in sufficient 95% alcohol to give 18.5 cc. of solution.

The product has been tested as follows:

Adults of the German cockroach, *Blatella germanica,* were chilled to dormancy, and small measured quantities of the alcohol solution were deposited on their ventral thoracic surfaces. With a dosage of 128 mgms. extractives per kg. of body weight, 95% were dead in 4 days.

Example XXXI 26 gms. of ground root of Ryania #9924 are extracted with 95% alcohol in a Soxhlet apparatus for 48 hours. The extractive, after defatting, gives 0.450 gm. of cold acetone-soluble material, which is made up to 5 cc. with 95 alcohol.

The product has been tested as follows:

Adults of the American cockroach, *Periplaneta Americana,* were injected in the stomach with an aqueous dilution of the alcohol solution. With a dosage of 200 mgms. extractives per kg. of body weight, 66% were dead in six days.

Adults of the American cockroach, *Periplaneta americana,* were injected in the bloodstream with an aqueous dilution of the alcohol solution. With a dosage of 100 mgms. extractives per kg. of body weight, 100% of the females were paralyzed within one day, and in 6 days, 100% were dead. With a dosage of 25 mgms. extractive/kg. body weight, 100% of the males were paralyzed within one day; and in 6 days, 100% were dead.

Adults of the German cockroach, *Blatella germanica,* were chilled to dormancy, and small measured quantities of the alcohol solution were deposited on their ventral thoracic surfaces. With a dosage of 500 mgms. extractive per kg. of body weight, 100% of the roaches were paralyzed in 2 days; in 4 days, 70% were dead.

Example XXXII

One kg. of ground root of Ryania #9880 are extracted with 95% alcohol in a Soxhlet apparatus for 48 hours. The alcohol extractive, after defatting, gives 59.5 gms. of cold acetone-soluble material. 2.160 gms. of that material are dissolved in sufficient 95% alcohol to give 10 cc. of solution.

The product has been tested as follows:

Adults of the American cockroach, *Periplaneta americana,* were injected in the bloodstream with an aqueous dilution of the alcohol solution. With a dosage of 100 mgms. extractives per kg. of body weight, 100% of the females were paralyzed within one day; in 6 days, 60% were dead. With a dosage of 25 mgms. extractive per kg. of body weight, 100% of the males were paralyzed within one day; in 6 days, 100% were dead.

Adults of the American cockroach, *Periplaneta americana*, were injected in the stomach with an aqueous dilution of the alcohol solution. With a dosage of 200 mgms. extractives per kg. of body weight, 100% of both males and females were paralyzed in 2 days; in 6 days, 100% were dead.

Adults of the German cockroach, *Blatella germanica*, were chilled to dormancy, and small measured quantities of the alcohol solution were deposited on their ventral thoracic surfaces. With a dosage of 1000 mgms. extractive per kg. of body weight, in 4 days 85% were dead.

Example XXXIII 900 gms. of ground stem of *Ryania* #9924 are extracted with 95% alcohol in a Soxhlet apparatus for 48 hours. 24.440 gms. of material are obtained. It is treated with petroleum ether, and 1.525 gms. of material removed. The defatted substance is extracted by triturating with four 100 cc. portions of acetone. In the last two triturations, the gummy mass is suspended in acetone and warmed to near the boiling point of acetone, then cooled with shaking before decantation. 11.707 gms. of material are obtained. 1.250 gms. are dissolved in sufficient 95% alcohol to give 10 cc. of solution.

The product has been tested as follows:

Adults of the German cockroach, *Blatella germanica*, were chilled to dormancy and small measured quantities of the alcohol solution were deposited on their ventral thoracic surfaces. With a dosage of 500 mgms. extractives per kg. of body weight, 95% were dead in 4 days.

Adults of the American cockroach, *Periplaneta americana*, were injected in the bloodstream with an aqueous dilution of the alcohol solution. With a dosage of 50 mgms. extractives per kg. of body weight, 100% of both the male and female roaches were paralyzed within one day; in 6 days, 100% were dead.

Adults of the American cockroach, *Periplaneta americana*, were injected in the stomach with an aqueous dilution of the alcohol solution. With a dosage of 100 mgms. extractives per kg. of body weight, 100% of the males and females were paralyzed within one day; in 6 days, 66% of the females, and 100% of the males were dead.

Example XXXIV 1500 gms. of ground root of *Ryania* #9924 are extracted with two successive 4.5 liter volumes of boiling 70% alcohol for 16 hour periods. The total filtered extract is concentrated in vacuo to one liter volume and chilled for 24 hours. The clear solution is decanted from deposited material and extracted thoroughly with chloroform. The combined chloroform extract and deposited material weigh 22.1 gms. The dry mass, after trituration with several 50 cc. portions of benzene, becomes granular. It is transferred to a Soxhlet apparatus and exhaustively extracted with benzene. The total benzene extract weighs 5.70 gms. 100 mgms. of this fraction are made up to 2 cc. with 50% alcohol containing 0.5% "Dreft."

This material has been tested as follows:

Adults of the German cockroach, *Blatella germanica*, were chilled to dormancy, and small measured quantities of an aqueous dilution of the alcohol solution were deposited on their ventral thoracic surfaces. With a dosage of 500 mgms. extractives per kg. of body weight, 100% of the roaches were paralyzed within one day; in 4 days, 100% were dead.

Adults of the American cockroach, *Periplaneta americana*, were injected in the bloodstream with an aqueous dilution of the alcohol solution. With a dosage of 500 mgms. extractives per kg. of body weight, 100% of the roaches were paralyzed within 5 minutes; in 6 days, 100% were dead.

Example XXXV

The undissolved material remaining after the benzene extraction step in the above example (34), is treated with acetone in a Soxhlet apparatus for 16 hours.

6.2 gms. of acetone-soluble material is obtained. After drying and weighing, this fraction is triturated with benzene. 5.8 gms. of powdery material remain undissolved. 120 mgms. of the fraction is made up to 2 cc. with 50% alcohol containing 0.5% "Dreft."

This product has been tested as follows:

Adults of the American cockroach, *Periplaneta americana*, were injected in the bloodstream with an aqueous dilution of the alcohol solution. With a dosage of 51.4 mgms. extractives per kg. of body weight, 100% of the roaches were paralyzed in 2 days; in 4 days, 100% were dead.

Adults of the German cockroach, *Blatella germanica*, were chilled to dormancy, and small measured quantities of an aqueous dilution of the alcohol solution were deposited on their ventral thoracic surfaces. With a dosage of 514 mgms. extractives per kg. of body weight, 100% of the roaches were paralyzed within one day; in 4 days, 100% were dead.

Example XXXVI 1330 gms. of ground root of *Ryania* #15008 are extracted with two eight-liter volumes of boiling 95% alcohol for 32 hour periods. The combined extracts are concentrated to 200 cc. in vacuo. The concentrate is poured into a large evaporating dish and thoroughly mixed with 60 gms. of light magnesium oxide powder and 50 cc. of water. The mass is dried. The powder thus obtained is extracted with acetone in a Soxhlet apparatus and the acetone solution is then dried. Two 100 cc. volumes of acetone dissolve 20.442 gms. of material, which is extracted with three hot 50 cc. portions of petroleum ether, after which it weighs 16.409 gms. On hardening with benzene, the weight is reduced to 15.499 gms. 0.880 gms. are made up to 10 cc. with 95% alcohol.

The product has been tested as follows:

Adults of the American cockroach, *Periplaneta americana*, were injected in the bloodstream with an aqueous dilution of the above alcohol solution. With a dosage of 30 mgms. extractives per kg. of body weight, 100% of the females were paralyzed within one day, and in 6 days, 100% were dead. With a dosage of 5 mgms. extractives per kg. of body weight, 100% of the males were paralyzed within one day; in 6 days, 100% were dead.

Example XXXVII 100 gms. of ground root of *Ryania* #9564 are extracted for two hours with one liter of 50% alcohol. The extract is filtered and concentrated to 100 cc., then treated with 10 gms. of lead acetate in saturated aqueous solution. After removing precipitated material, and treating with hydrogen sulfide, the lead-free filtrate is evaporated to dryness in vacuo. 0.73 gm. of gummy residue is obtained. 250 mgms. are made up to 5 cc. with water, and tested as follows:

Adults of the American cockroach, *Periplaneta americana*, were injected in the bloodstream with an aqueous dilution of the alcohol solution. With a dosage of 200 mgms. extractives per kg. of body weight, 100% were dead in 6 days.

Example XXXVIII

One kg. of ground root of Ryania #9924 is extracted in a Soxhlet apparatus with 95% alcohol for 48 hours. The extract is filtered and concentrated to 140 cc. 28 cc. of the concentrate are mixed with 4 gms. of light magnesium oxide powder and 10 cc. of water, in an evaporating dish. The mass is dried. The dry powder obtained is extracted with acetone in a Soxhlet apparatus for three hours. The acetone extract, which is a very light tan, amorphous powder, weighs 2.334 gms. After trituration with petroleum ether, 1.732 gms. of material remain undissolved. It is made up to 8 cc. with 95% alcohol, and has been tested as follows:

Adults of the American cockroach, *Periplaneta americana*, were injected in the bloodstream with an aqueous dilution of the alcohol solution. With a dosage of 22 mgms. extractives per kg. of body weight, 50% of the females were dead in 6 days. With a dosage of 5 mgms. extractives per kg. of body weight, 90% of the males died.

Adults of the German cockroach, *Blatella germanica*, were chilled to dormancy and small measured quantities of the alcohol solution were deposited on their ventral thoracic surfaces. With a dosage of 53 mgms. extractives per kg. of body weight, 88% were dead in four days.

Example XXXIX 10 gms. of ground root of Ryania #15150 are pulverized and agitated with 60 cc. 95% alcohol in a ball mill for 12 hours. The product is centrifuged (1 cc. alcohol extract=0.17 gm. root).

This clear liquor has been tested as follows:

Adults of the German cockroach, *Blatella germanica*, were chilled to dormancy, and small measured quantities of the alcohol extract were deposited on their ventral thoracic surfaces. With a dose of the extractives from 4 gms. root/kg. body weight, 80% were dead in 4 days.

Example XL 10 gms. of ground stems of Ryania #9924 are pulverized and agitated with 80 cc. of water in a ball mill for 12 hours. The product is centrifuged. The resultant clear liquor has been tested as follows (1 cc. aqueous extract=0.125 gm. root):

Adults of the German cockroach, *Blatella germanica*, were immersed for two minutes in aqueous extract containing extractives from 1 gm. of stem in 8 cc. solution. In 4 days, 20% were dead.

Adults of the American cockroach, *Periplaneta americana*, were injected in the bloodstream with aqueous extract in amounts sufficient to give a dosage of the extractives from 5 gms. stem per kg. of body weight. Within five minutes, 100% of the roaches were paralyzed; in six days, 100% were dead.

Adults of the American cockroach, *Periplaneta americana*, were injected in the stomach with a sufficient amount of the aqueous extract to give a dosage of the extractives from 12.5 gms. stem/kg. body weight. In six days, 40% were dead.

Example XLI 100 gms. of ground leaves of Ryania #9924 are extracted with two 500 cc. volumes of water at room temperature with stirring for 5 and 3 hour periods, respectively. The combined extracts are evaporated to dryness in vacuo. The residue is extracted with two 50 cc. portions of boiling 95% alcohol. The alcoholic solutions are decanted, cooled, filtered, and evaporated to dryness. 1.106 gms. of material are obtained. This is made up to 10 cc. with 95% alcohol and tested as follows:

Adults of the German cockroach, *Blatella germanica*, were chilled to dormancy, and an alcohol solution of the aqueous extractives was deposited in small measured quantities on their ventral thoracic surfaces. With a dose of 4.44 gms. extractives per kg. of body weight, 100% of the roaches were paralyzed within one day; in four days, 100% were dead.

Example XLII 100 gms. of ground stems of Ryania #9924 are extracted by stirring at room temperature with three successive 700 cc. volumes of water for 12 hour periods. The combined filtrates are concentrated in vacuo (30–40 mm.) with gentle warming on the steam bath, to 210 cc. volume, filtered, and then extracted continuously with ether for 48 hours. The residue (0.270 gm.) is a light-tan, amorphous powder. The powder is dissolved in sufficient 95% alcohol to make a 5 cc. volume of solution; 1 cc. alcohol solution=54 mgms. residue.

The product has been tested as follows:

Adults of the German cockroach, *Blatella germanica*, were chilled to dormancy and small measured quantities of the alcohol solution were deposited on their ventral thoracic surfaces. With a dosage of 108 mgms. extractives per kg. of body weight, within one day, 100% of the roaches were paralyzed; in four days, 100% were dead.

Adults of the cockroach, *Blatella germanica*, were in cylindrical screen-wire cages and sprayed with an aqueous dilution of the above alcohol solution containing 1.25 mgms. of active principles per cc. In 6 days, 60% of the females and 100% of the males were dead.

Nymphs of the squash bug, *Anasa tristis*, were placed in a glass dish and sprayed with an aqueous dilution of the above alcohol solution containing 0.27 mgm. active principles per cc. The bugs were then placed on squash foliage for feeding and mortality observations. In six days, 44% were dead.

When nymphs of the squash bug, *Anasa tristis*, were sprayed with an aqueous dilution of the above alcohol solution containing 1.25 mgms. of active principles per cc., 74% were dead in six days.

Example XLIII 20 cc. of Ryania #15008 root aqueous extract (1 cc.=1.67 gms. root) are extracted with 300 cc. of ethylene dichloride in 25 cc. portions. The ethylene dichloride solution is evaporated in vacuo (30–40 mm.), and 35 mgms. of a light-tan, amorphous powder are obtained. This is made up to 1.75 cc. with 95% alcohol; 1 cc. alcohol solution=20 mgms. residue.

The product was tested as follows:

Adults of the German cockroach, *Blatella germanica*, were chilled to dormancy and small measured quantities of the alcohol solution were deposited on their ventral thoracic surfaces. With a dosage of 800 mgms. extractives per kg. of body weight, 100% of the roaches were paralyzed in one day; in 4 days, 100% were dead.

Example XLIV 20 cc. of Ryania #15008 root aqueous extract (1 cc.=1.67 gms. root) are extracted with 300 cc. of benzene in 25 cc. portions. The benzene solution is evaporated in vacuo (30–40 mm.), and 14 mgms. of a light-tan, amorphous powder are obtained. This is made up to 0.9 cc. with 95% alcohol; 1 cc. alcohol solution=15.5 mgms. residue.

The product was tested as follows:

Adults of the German cockroach, Blatella germanica, were chilled to dormancy and small measured quantities of the alcohol solution of the benzene extracts were deposited on their ventral thoracic surfaces. With a dosage of 620 mgms. extractives per kg. of body weight, 95% of the roaches were paralyzed in one day, and in 4 days, 100% were dead.

*Example XLV*

20 cc. of Ryania #15150 root aqueous extract (1 cc.=0.74 gm. root) are extracted with 250 cc. chloroform in 25 cc. portions. The chloroform solution is evaporated in vacuo (30–40 mm.), and 69 mgms. of a light-tan, amorphous powder are obtained. This is made up to 2.0 cc. with 95% alcohol; 1 cc. alcohol solution=35 mgms. residue.

The product has been tested as follows:

Adults of the German cockroach, Blatella germanica, were chilled to dormancy and small measured quantities of the alcohol solution were deposited on their ventral thoracic surfaces. With a dosage of 80 mgms. extractives per kg. of body weight, 100% of the roaches were paralyzed within one day; in 4 days, 100% were dead.

*Example XLVI*

30 gms. of ground root of Ryania #15180 are refluxed with 150 cc. of 50% ethanol for five hours. The extract is filtered into a round-bottomed flask and concentrated in vacuo (30–40 mm.) with gentle warming on the steam bath to a thick syrup. The flask is then connected to an oil vacuum pump, and the remaining solvent removed by ½ hour evaporation at 1–2 mm. pressure and approximately 50° C. The residue is then extracted with three successive 10 cc. portions of boiling 95% alcohol. The solvent is removed from the decanted extract as described above, giving a residue of 232 mgms. brown amorphous powder. 198 mgms. are dissolved in sufficient 95% alcohol to make 7 cc. volume of solution; 1 cc. alcohol solution=28 mgms. residue.

The product has been tested as follows:

Adults of the German cockroach, Blatella germanica, were chilled to dormancy, and an alcohol solution of 50% alcohol extract was deposited in small measured quantities on their ventral thoracic surfaces. With a dosage of 112 mgms. extractives per kg. of body weight, 70% of the roaches were paralyzed within one day; in 4 days, 55% were dead.

*Example XLVII*

10 gms. of ground root of Ryania #9880 are pulverized and agitated with 100 cc. of water in a ball mill for 12 hours. The product is centrifuged. The clear liquor obtained has been tested as follows:

Adults of the American cockroach, Periplaneta americana, were injected in the bloodstream with the aqueous extract in amounts sufficient to give a dosage of extractives from 10 gms. of root/kg. body weight. In 6 days, 75% were dead.

Adults of the German cockroach, Blatella germanica, were immersed for two minutes in aqueous extract containing the extractives from one gm. of root in 10 cc. solution. In 4 days, 25% were dead.

Adults and last-instar nymphs of the cockroach, Blatella germanica, were placed in cylindrical screen-wire cages and sprayed with aqueous extract containing the extractives from one gm. of root in 20 cc. water containing 1/16% Orvus. In 6 days, 20% of the adults were dead—and 25% of last-instar nymphs were dead.

*Example XLVIII*

100 gms. of well ground root of Ryania #15008 are stirred at room temperature with successive 300, 200, and 200 cc. volumes of water for 1.5, 1.5 and 5 hours, respectively. The combined filtrates are extracted with 10 portions of ether totaling one liter. 181 mgms. ether residue is obtained upon evaporation of the extract in vacuo. The ether extracted aqueous solution is concentrated in vacuo (30–40 mm.) with gentle warming on the steam bath to 250 cc. volume, and then extracted continuously with ether for 15 hours, yielding a further 141 mgms. extract. The ether extracts are tan-colored, amorphous powders, giving a light-brown solution. The combined ether residue, 322 mgms., is dissolved in 5 cc. of 95% alcohol; 1 cc. alcohol solution=65 mgms. residue.

The product has been tested as follows:

Adults of the German cockroach, Blatella germanica, were chilled to dormancy and small measured quantities of the alcohol solution were deposited on their ventral thoracic surfaces. With a dose of 100 mgms. extractives per kg. of body weight, in 4 days, 80% were dead.

Adults of the American cockroach, Periplaneta americana, were injected in the bloodstream with an aqueous dilution of the alcohol solution. With a dosage of 25 mgms. extractives per kg. of body weight, 100% of the females were paralyzed within one day, and in six days, 100% were dead. With a dosage of 5 mgms. extractives per kg. of body weight, 100% of the males were paralyzed within one day, and in six days 100% were dead.

*Example XLIX*

200 gms. of ground root of Ryania #15150 are stirred at room temperature with three successive 1.5 liter volumes of water for 12 hour periods. Toluene is added to all extraction solutions. The total extract is concentrated to 205 cc., in vacuo. 195 cc. are extracted continuously with ether for 36 hours, giving 1.780 gms. of ether extract. This is made up to 10 cc. with 95% alcohol.

The product has been tested as follows:

Adults of the American cockroach, Periplaneta americana, were injected in the bloodstream with an aqueous dilution of the alcohol solution. With a dosage of 25 mgms. extractives per kg. of body weight, 100% of the females were paralyzed within one day; in 6 days, 100% were dead. With a dosage of 2.5 mgms. extractives per kg. of body weight, 100% of the males were paralyzed within one day, and in 6 days, 100% were dead.

Adults of the American cockroach, Periplaneta americana, were injected in the stomach with an aqueous dilution of the alcohol solution. With a dosage of 30 mgms. extractives per kg. of body weight, 100% of both females and males were paralyzed within one day, and in 6 days, 100% were dead.

Adults of the German cockroach, Blatella germanica, were chilled to dormancy, and small measured quantities of the alcohol solution were deposited on their ventral thoracic surfaces.

With a dosage of 80 mgms. extractives per kg. of body weight, 90% were dead in 4 days.

Adults of the milkweed bug, *Oncopeltes fasciatus*, were placed in a glass jar and sprayed with an aqueous dilution of the alcohol solution containing 5 mgms. of active principles per cc. In 7 days, 100% were dead.

Foliage of the smart weed was sprayed with an aqueous dilution of the alcohol solution containing 0.31 mgm. active principles per cc. Adults of the Japanese beetle, *Popillia japonica*, were placed on the foliage for feeding. In 5 days, 70% were dead, and the foliage had received over 90% protection from feeding damage.

Adults of the German cockroach, *Blatella germanica*, were placed in a cylindrical screen-wire cage, and sprayed with an aqueous dilution of the alcohol solution containing 0.67 mgm. of active principles per cc. In 6 days, 70% of the females and 100% of the males were dead.

Nymphs of the squash bug, *Anasa tristis*, were placed in a glass dish and sprayed with an aqueous dilution of the alcohol solution containing 0.83 mgm. of active principles per cc. The bugs were placed on squash foliage for feeding and mortality observations. In 6 days, 70% were dead.

Foliage of the mulberry tree was sprayed with an aqueous dilution of the alcohol solution containing 0.25 mgm. of active principles per cc. Half-grown larvae of the silkworm, *Bombyx mori*, were placed on the foliage for feeding. In 4 days, the kill of larvae was 70% and the foliage had received over 90% protection from feeding attack.

Nymphs of the potato aphid, *Illinoia solenifolii*, feeding upon tomato foliage were sprayed with an aqueous dilution of the alcoholic solution containing 2 mgms. of active principles per cc. In 2 days, approximately 70% were dead.

Modifications may be made in carrying out the present invention without departing from the spirit and scope thereof, and we are to be limited only by the appended claims.

We claim:

1. An insecticide and insect-repellent, comprising alkaloids of plants of the genus Ryania and a carrier therefor.

2. An insecticide and insect-repellent, containing an extract comprising alkaloids of plants of the genus Ryania and a carrier therefor.

3. An insecticide and insect-repellent, containing a concentrate comprising alkaloids of plants of the genus Ryania and a carrier therefor.

4. An insecticide and insect-repellent, containing an aqueous extract comprising alkaloids of plants of the genus Ryania and a carrier therefor.

5. An insecticide and insect-repellent, containing a concentrate obtained by drying an aqueous extract comprising alkaloids of plants of the genus Ryania and a carrier therefor.

6. An insecticide and insect-repellent, containing an aqueous-ethylene dichloride extract comprising alkaloids of plants of the genus Ryania and a carrier therefor.

7. An insecticide and insect-repellent, containing a concentrate obtained by drying an aqueous-ethylene dichloride extract comprising alkaloids of plants of the genus Ryania and a carrier therefor.

8. An insecticide and insect-repellent, containing an ethanol extract comprising alkaloids of plants of the genus Ryania and a carrier therefor.

9. An insecticide and insect-repellent, containing a concentrate obtained by drying an ethanol extract comprising alkaloids of plants of the genus Ryania and a carrier therefor.

10. An insecticide and insect-repellent, containing an ethylene dichloride extract comprising alkaloids of plants of the genus Ryania and a carrier therefor.

11. An insecticide and insect-repellent, containing a concentrate obtained by drying an ethylene dichloride extract comprising alkaloids of plants of the genus Ryania and a carrier therefor.

12. An insecticide and insect-repellent, containing an aqueous-organic solvent extract comprising alkaloids of plants of the genus Ryania and a carrier therefor.

13. An insecticide and insect-repellent, containing a concentrate obtained by drying an aqueous-organic solvent extract comprising alkaloids of plants of the genus Ryania and a carrier therefor.

14. An insecticide and insect-repellent, containing an organic solvent extract comprising alkaloids of plants of the genus Ryania and a carrier therefor.

15. An insecticide and insect-repellent, containing a concentrate obtained by drying an organic solvent extract comprising alkaloids of plants of the genus Ryania and a carrier therefor.

KARL FOLKERS.
EDWARD ROGERS.
RALPH. E. HEAL.